(12) United States Patent
Chen

(10) Patent No.: US 7,316,409 B2
(45) Date of Patent: Jan. 8, 2008

(54) FRONT FORK OF BICYCLE WITH BUFFER APPARATUS

(75) Inventor: Leo Chen, Taichung (TW)

(73) Assignee: Spinner Industry Co., Ltd., Taichung (TW)

( * ) Notice: Subject to any disclaimer, the term of this patent is extended or adjusted under 35 U.S.C. 154(b) by 372 days.

(21) Appl. No.: 11/034,806

(22) Filed: Jan. 14, 2005

(65) Prior Publication Data

US 2006/0157954 A1     Jul. 20, 2006

(51) Int. Cl.
  *B62K 21/02* (2006.01)
  *F16F 9/00* (2006.01)
  *F16F 9/34* (2006.01)
(52) U.S. Cl. ............... 280/276; 280/279; 188/322.22; 188/319.2
(58) Field of Classification Search ........... 188/322.22, 188/322.15, 282.1, 282.8, 282.9, 319.2; 280/276, 280/277, 279; 267/217, 64.15, 218, 64.22
See application file for complete search history.

(56) References Cited

U.S. PATENT DOCUMENTS

| | | | | | |
|---|---|---|---|---|---|
| 2,336,137 | A | * | 12/1943 | Thornhill ................. | 267/64.26 |
| 3,874,486 | A | * | 4/1975 | Katsumori et al. ......... | 188/314 |
| 4,795,009 | A | * | 1/1989 | Tanahashi et al. .......... | 188/315 |
| 5,275,264 | A | * | 1/1994 | Isella ....................... | 188/299.1 |
| 5,725,226 | A | * | 3/1998 | Cabrerizo-Pariente ...... | 280/276 |
| 6,253,888 | B1 | * | 7/2001 | Bell et al. .................... | 188/275 |
| 6,592,136 | B2 | * | 7/2003 | Becker et al. .............. | 280/276 |
| 7,011,325 | B2 | * | 3/2006 | Kinzler et al. .............. | 280/276 |
| 7,044,274 | B2 | * | 5/2006 | Chen ....................... | 188/319.2 |
| 7,134,534 | B2 | * | 11/2006 | Chen ...................... | 188/322.13 |
| 2002/0033309 | A1 | * | 3/2002 | Kamioka .................... | 188/280 |
| 2006/0290095 | A1 | * | 12/2006 | Chen .......................... | 280/276 |

* cited by examiner

*Primary Examiner*—Lesley D. Morris
*Assistant Examiner*—Daniel Yeagley
(74) *Attorney, Agent, or Firm*—Bacon & Thomas, PLLC

(57) ABSTRACT

A front fork of a bicycle, which has damping function, has a lower fork having a closed bottom. An upper fork tube is inserted into the lower fork for reciprocation relative to the lower fork, which has a nozzle at a top thereof. Oil is received in a space between the lower fork and the upper fork tube. An air chamber is formed in a space between a surface of the oil and the nozzle, which a gas is issued therein and a pressure of the gas is greater than an atmospheric pressure, and a damping device, which is mounted at a bottom of the upper fork tube and under the surface of the oil, has multiple, variable oil flow paths through which oil passes as the upper and lower fork member reciprocate to provide various damping characteristics dependent on the relative speed or impact the fork members experience with respect to each other.

2 Claims, 6 Drawing Sheets

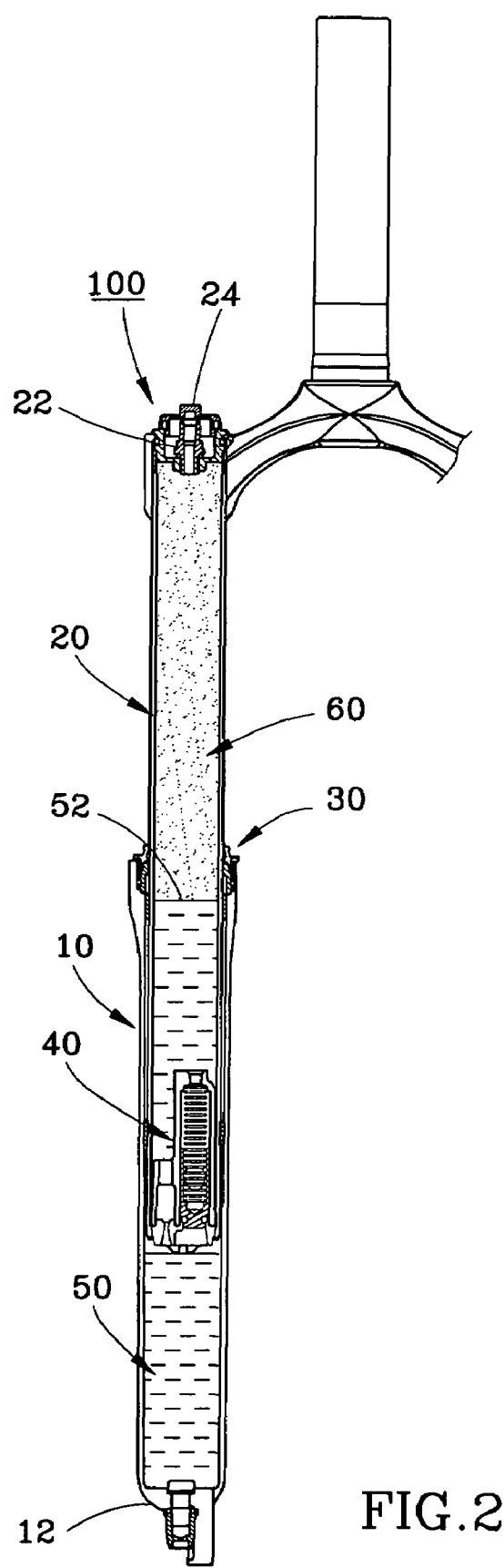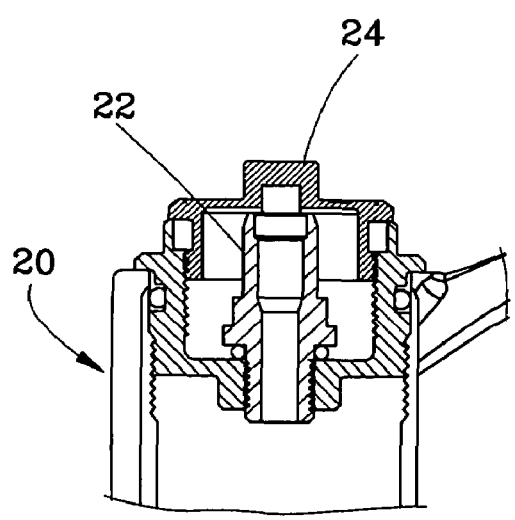
FIG.2
FIG.3

FRONT FORK OF BICYCLE WITH BUFFER APPARATUS

BACKGROUND OF THE INVENTION

1. Field of the Invention

The present invention relates generally to a bicycle, and more particularly to a front fork of a bicycle with a suspension and damping apparatus.

2. Description of the Related Art

FIG. 1 shows a conventional front fork 1 with a hydraulic damping apparatus, which has an upper tube 2, a bottom fork 3 and a valve 4 mounted at a bottom of the upper tube 2. The valve 4 has an oil outlet 4a at a middle portion thereof, two apertures 4b at opposite sides of the oil outlet 4a and two plates 5 at a bottom of the valve 4 and below the apertures 4b respectively. A needle valve 6 is inserted into the tube 2 from a top thereof. A front end 6a of the needle valve 6 is aligned with the oil outlet 4a of the valve 4, and a rear end 6b thereof is rotated to adjust a distance between the front end 6a and the oil outlet 4a, such that a velocity of an oil 7 is changed to adjust the resistance. The needle valve 6 takes the impact of the oil 7 flowing upwards via the oil outlet 4a directly that would damage the needle valve 6 after a long time of use. In addition, the oil 7 usually has air bubbles therein while it flows in the valve 4, and the oil 7 has a constant flow rate that the buffer capacity cannot absorb the impact of the front fork 1 gradually.

SUMMARY OF THE INVENTION

The primary objective of the present invention is to provide a front fork of a bicycle with a damping apparatus, which increases the efficiency of riding.

The secondary objective of the present invention is to provide a front fork of a bicycle with a simplified damping and suspension system to minimize the overall fork weight.

The third objective of the present invention is to provide a front fork of a bicycle with a multi-function damping system that will a) respond lightly to small bumps and low frequency oscillation; b) respond freely to large bumps and more severe impacts; c) minimize relative suspension motion induced by rider pedaling.

The fourth objective of the present invention is to provide a front fork of a bicycle with a variable damping apparatus, which will respond in proportion to the severity of the bumps or impacts.

The fifth objective of the present invention is to provide a front fork of a bicycle with a buffer apparatus, which works so as to decrease bubbles derived, and reduce noise caused by oil flowing through the restriction.

According to the objectives of the present invention, a front fork comprises a lower fork having a closed bottom. An upper fork tube is inserted into the lower fork for reciprocation relative to the lower fork, which has a nozzle at a top thereof. Oil is received in a space between the lower fork and the upper fork tube. A gas or air chamber is formed in a space between a surface of the oil and the nozzle, in which a gas is issued therein where pressure of the gas is greater than atmospheric pressure, and a damping device is mounted at a bottom of the upper fork tube and under the surface of the oil, has multiple oil flow paths for control of oil flowing therethrough.

BRIEF DESCRIPTION OF THE DRAWINGS

FIG. 2 is a sectional view of a preferred embodiment of the present invention;

FIG. 3 is a sectional view of the nozzle of the preferred embodiment of the present invention;

DETAILED DESCRIPTION OF THE INVENTION

Figure 1:
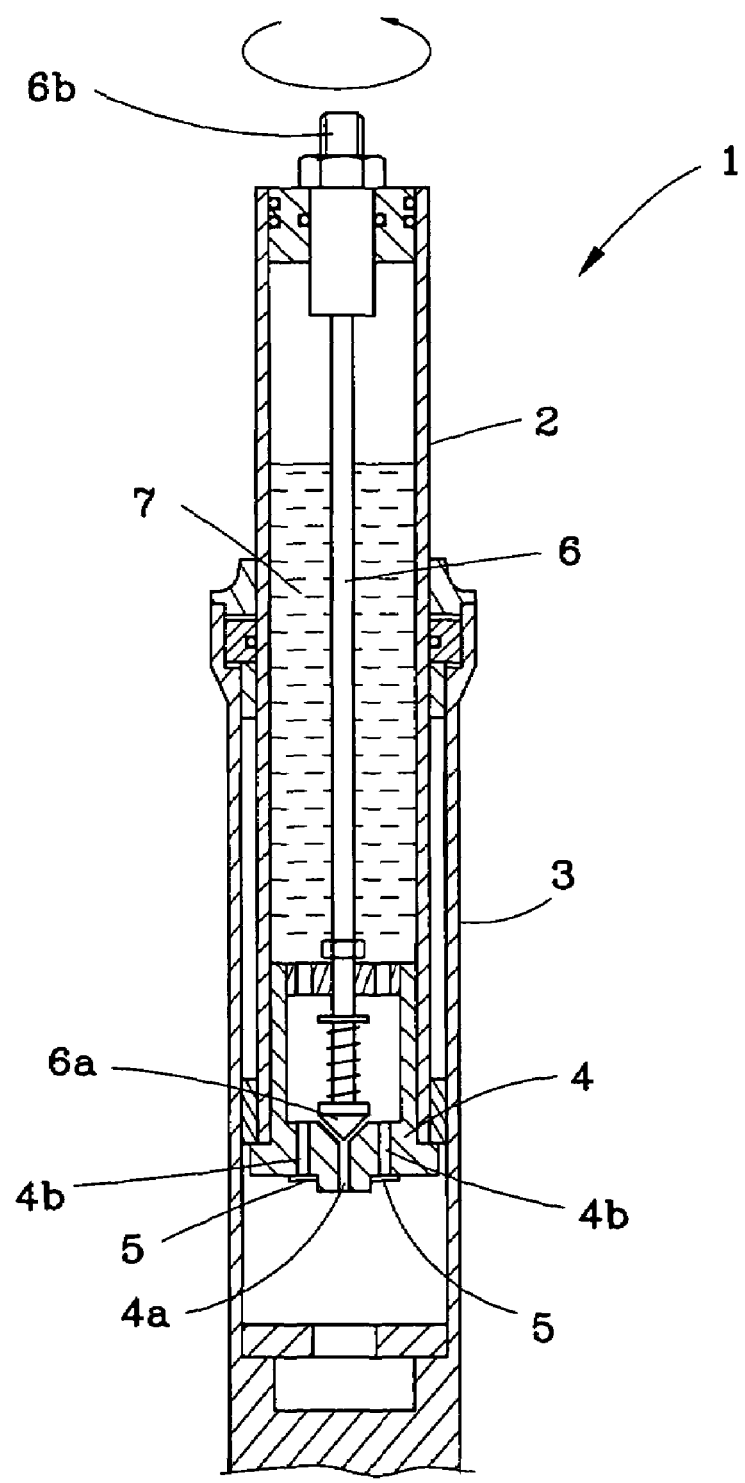
FIG. 1 is a sectional view of a prior art front fork assembly showing the hydraulic damping apparatus.
Figure 4:
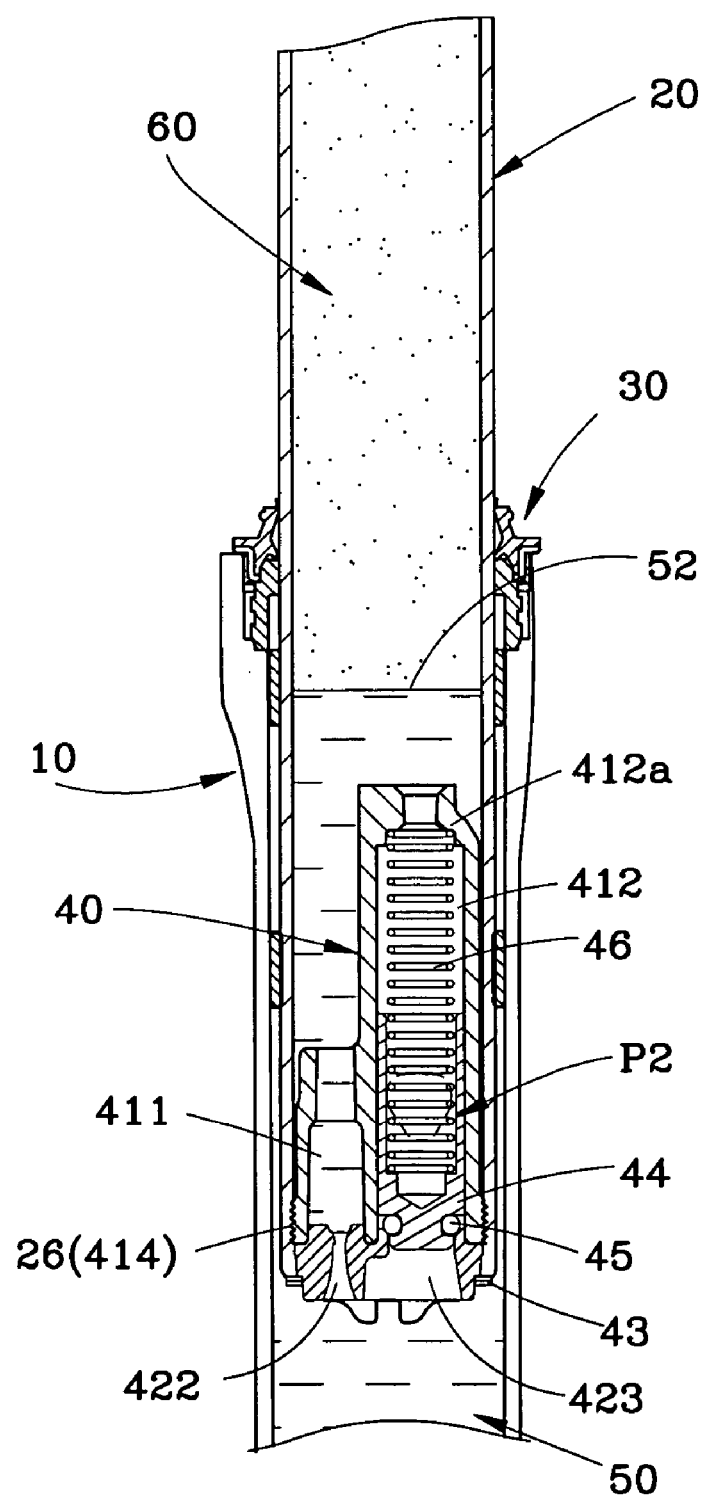
FIG. 4 is a sectional view of the damping device of the preferred embodiment of the present invention, showing the spool valve or piston at the lower position.

As shown in FIG. 2 to FIG. 4, a front fork 100 of the preferred embodiment of the present invention mainly comprises a lower fork 10, an upper fork tube 20, a seal assembly 30 and a damping device 40. The front fork 100 is issued with oil 50 therein allowing space for pressurized gas 60.

The lower fork 10 has a closed bottom end 12.

The upper fork tube 20 is inserted into the lower fork 10 to be moved in a linear reciprocating motion with respect to the lower fork 10. The upper fork tube 20 has a nozzle 22 at a top thereof and a lid 24 to cover the nozzle 22. The upper fork tube 20 further has an inner threaded section 26 at an interior side thereof.

The seal assembly 30 is mounted at a top of the lower fork 10 between an interior side of the lower fork 10 and the exterior side of the upper fork tube 20. The seal assembly 30 serves functions of preventing the oil 50 from leakage, maintaining a seal to preserve gas pressure 60 and sealing the lower fork 10.

The damping device 40 has a column-like main member 41, a bottom plate 42, a ring 43, a spool valve or piston 44, an O-ring 45 and an elastic member, which is a spring 46 in the present invention.

Figure 5:
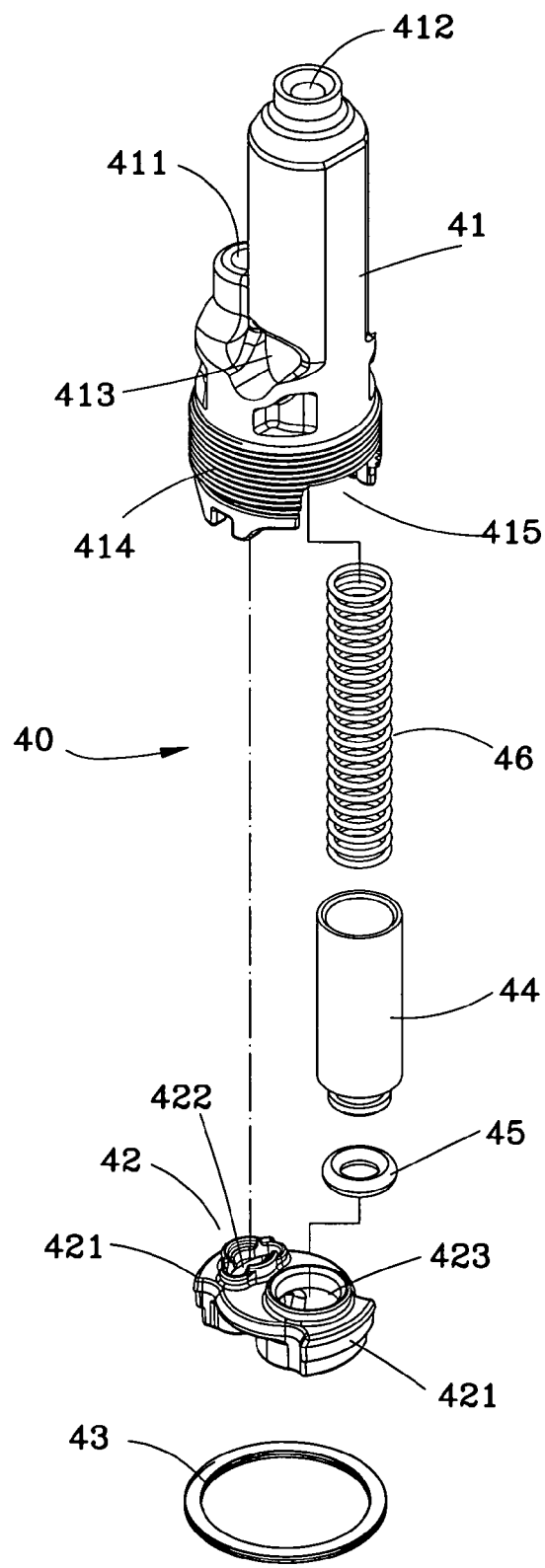
FIG. 5 is an exploded perspective view of the damping device of the preferred embodiment of the present invention.

As shown in FIG. 5, the main member 41 has a return hole 411 and a spool cylinder with oil vent 412. The spool cylinder 412 has a section with a smaller diameter at the top, which is defined as a shoulder portion 412a. The main member 41 further has two lateral holes 413 communicated with the spool cylinder 412, an outer threaded section 414 at a bottom thereof to be engaged with the inner threaded section 26 of the upper fork tube 20 and two gaps 415 adjacent to the bottom thereof.

The bottom plate 42 has two protrusions 421 to be engaged with the gaps 415 of the main member 41. The ring 43 is fitted to the plate 42 to secure it to the main member 41. The plate further has a shaped orifice 422 and an oil inlet 423, wherein the orifice 422 is communicated with the return hole 411, and the orifice 422 has an upper section with a smaller diameter and a lower section with a greater diameter, and the oil inlet 423 is communicated with the spool cylinder 412.

Figure 6:
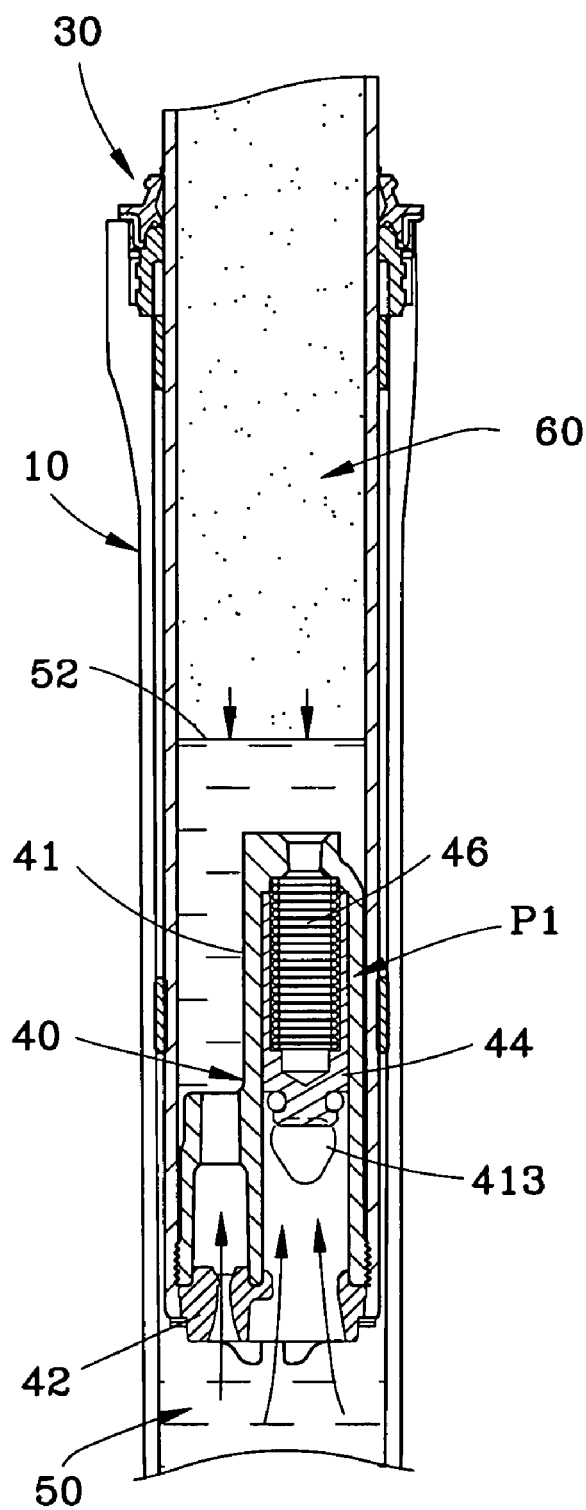
FIG. 6 is a sectional view similar to FIG. 4, showing the spool valve or piston at the upper most position.

The spool valve or piston 44 is open at a top thereof and is closed at the bottom thereof. The O-ring 45 is fitted to the piston adjacent to the bottom thereof. The piston 44 is received in the spool cylinder 412 for movement from a lower position P2, as shown in FIG. 4, in which the piston 44 seals the lateral holes 413, toward an upper position P1, as shown in FIG. 6, in which the piston 44 departs from the lateral holes 413 to allow oil flow from the lower fork 10 to the upper fork tube 20.

The spring 46 is installed in the spool cylinder 412 with opposite ends urging the shoulder portion 412a and the piston 44 respectively. The spring 46 urges the piston 44 to the lower position P2.

The oil 50 has a viscosity, as shown in FIG. 2, for which a surface 52 thereof is higher than the damping device 40 for a predetermined distance, and an air chamber 60 is formed between the surface 52 and the nozzle 22. A high-pressure gas is issued into the air chamber 60 via the nozzle 22 to make the front fork 100 having a pressure in the air chamber 60 greater than that of outside. The pressure in the air chamber 60 can be adjusted to meet a riders' requirements.

As the fork compresses, oil flows through the damping devise 40 into the cavity of the upper fork tube 20 reducing the volume available for the pressurize gas 60. As this gas further compresses, the force acting on the surface of the oil 52 increases exponentially. This rise in pressure also effects the damping characteristic of the spool valve 44 to increase the damping coefficient of the system as the pressure rises. The relative volume allowed for the pressurized gas 60 with respect to the intended fork stroke sets the progressive feel of the fork for the rider. This feel can be easily changed and tailored to a given rider by adding or removing small amounts of oil, and by increasing or decreasing the initial pressure of the gas 60.

As shown in FIG. 4, when a smaller impact is exerted on the front fork 100, some oil 50 will flow through the orifice 422, which has a smaller flow area, but the spool valve or piston 44 is not moved because of the pressure in the air chamber 60 and the spring 46. Under this condition, the spool valve or piston 44 seals the lateral holes 413 still, and the lower fork 10 can move only slowly relative to the upper fork tube 20. As a result, the fork 100 responds with a high damping coefficient to smaller impacts making more of the rider's exertion delivered to motivating the bicycle, and less of the rider's exertion absorbed by the hydraulic damping, thus increasing the riders efficiency.

As shown in FIG. 6, when the front fork 100 of the present invention is exerted by a greater impact, sufficient to overcome the force of the spring 46 and the pressure in the upper fork tube 20, the lower fork 10 is moved toward the upper fork tube 20, and the oil 50 flows through the orifice 422 and moves the piston 44 from the lower position P2 toward the upper position P1. In the movement of piston 44 from the lower position P2 toward the upper position P1, the lateral holes 413 are exposed gradually such that the flow rate of the oil 50 flowing through the lateral holes 413 rises gradually and proportionally to the severity of the bump or impact. When the bump or impact is of lower severity but sufficient to overcome the combined effects of the gas 60 pressure and the spring 46, the spool valve or piston 44 moves only enough to allow a small effective orifice by moving from the lower position P2 upward toward the upper position P1 but only enough to slightly open the oil port 413. The shape of the lateral holes 413 are designed to allow progressively more flow as the spool valve or piston 44 is forced higher and higher due to the severity of the bump or impact encountered. Pressure in the air chamber 60 slows the flow speed of the oil 50 as the compression continues and applies an exponentially increasing force on both the surface of the oil 50 and the back of the spool valve 44 to give the front fork 100 of the present invention a smooth and progressive damping feel. More damping as the compression becomes greater.

For rebound, when the lower fork 10 is moved away from the upper fork tube 20, the piston 44 is moved back to the lower position P2, and oil 50 is forced by gas 60 pressure to flow back to a space (not shown) under the damping device 40 in the lower fork 10 via the return hole 422. Since the volume for gas 60 increases as the fork lower 10 moves away from the upper fork tube 20 and oil is forced out of the upper fork tube 20 through the damper assembly 40, the pressure of gas 60 decreases. When gas 60 pressure is high, it provides a high force to push oil 50 through the shaped orifice 422 which gives a higher flow rate. As pressure decreases in the upper fork tube 20 at 60, the flow rate of the oil decreases, thus reducing the rebound velocity of the lower fork 10 with respect to the upper fork tube 20. This gives the rider a higher rebound rate when the fork is highly compressed, and a lower rebound rate when the fork is near full extension.

The front fork 100 of the present invention provides a smooth buffer capacity to absorb impact to provide the rider with a comfortable riding condition. The high-pressure gas issued in the air chamber 60 can reduce the oil 50 from generating bubbles therein. The pressure in the air chamber 60 is adjustable to change the flow speed of the oil 50 to meet all situations.

The shaped orifice 422 has a converging/diverging nozzle geometry that accelerates then decelerates the oil as it passes through. This reduces the noise induced by passing oil, and reduces the bubbles retained in the oil.

The front fork 100 of the present invention provides a smooth damping function for a variety of impact conditions to provide efficient riding in small bump conditions and a progressive absorption in larger bump or impact conditions. It also allows multiple ways of tuning the fork, increasing or decreasing gas 60 pressure, increasing or decreasing oil 50 quantity, for the individual requirements of each rider.

Figure 7:
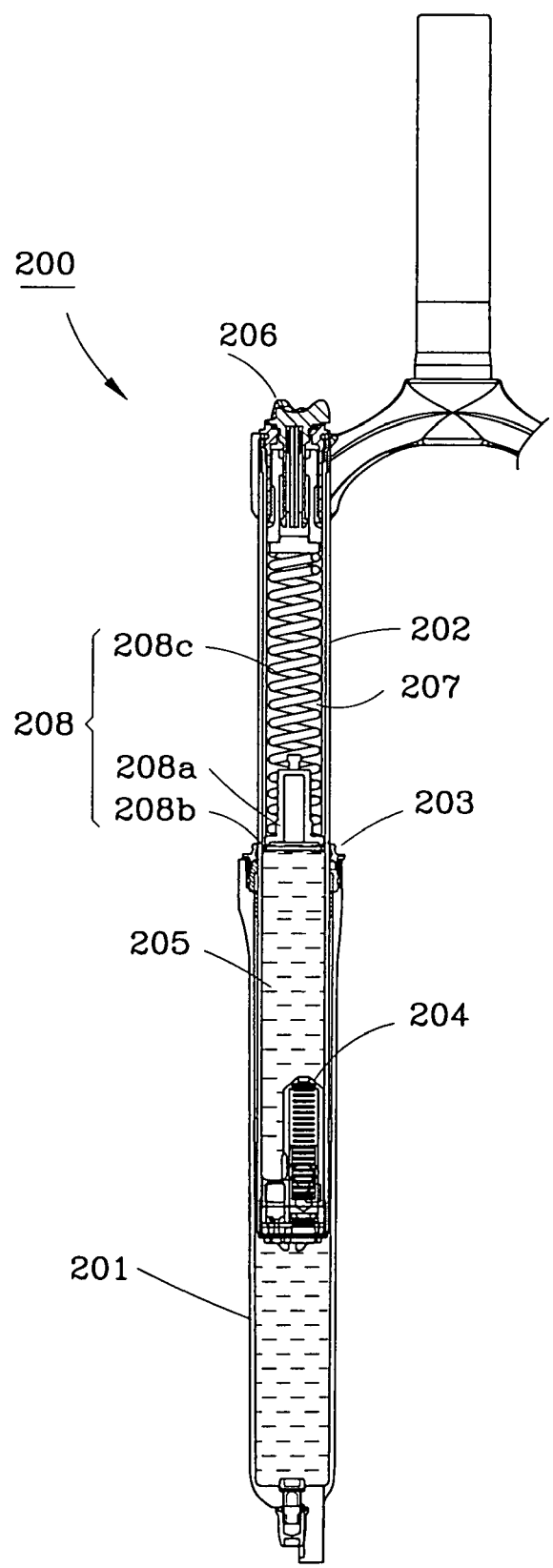
FIG. 7 is a sectional view of a second preferred embodiment of the present invention.

FIG. 7 shows a front fork 200 of the second preferred embodiment of the present invention, similar to the front fork 100 the first preferred embodiment, having a lower fork 201, an upper fork tube 202, an anti-leak assembly 203, a damping device 204 and oil 205. The upper fork tube 202 is provided with a lid 206 on a top thereof, and has a chamber 207 between the lid 206 and a level of the oil 205 and a biasing device 208 in the chamber 207. The biasing device 208 has a float plate 208a, a ring 208b and a pushing device 208c, which is a spring, wherein the float plate 208a floats on the oil level, and the ring 208b is fitted to the float plate 208a and pressing an interior wall of the upper fork tube 202 to prevent the oil 205 from leakage to the chamber 207, and the spring 208c has opposite ends resting the lid 206 and the float plate 208a to slow the speed of oil flow. The front fork 200 of the second preferred embodiment serves the same function.

The specification of the present invention only discloses one of the preferred embodiments according to the scope of the present invention. Any equivalent device should be still within the scope of the present invention.

What is claimed is:

1. A front fork, comprising:

a lower fork having a closed bottom;

an upper fork tube inserted into the lower fork for reciprocation relative to the lower fork and having a nozzle at a top thereof;

an oil received in a space between the lower fork and the upper fork tube;

an air chamber formed in a space between a surface of the oil and the nozzle, which a gas is issued therein and a pressure of the gas is greater than an atmospheric pressure, and a damping device, which is mounted at a bottom of the upper fork tube and under the surface of the oil, having an orifice for the oil flowing therethrough;

wherein the damping device has a column-like main member, a piston and an elastic member, which the main member has an oil vent and at least a lateral hole in communication with the oil vent, and the piston is received in the oil vent for movement between a lower position, in which the piston seals the lateral hole, and a continuum of upper positions, in which the lateral hole is exposed in whole or in part through a gradient, and the oil flows through the lateral hole, and the elastic member is received within the main member to urge the piston to the lower position.

2. The front fork as defined in claim 1, wherein the damping device further has a bottom plate coupled with a bottom of the main member, which has the orifice and an oil inlet, and the oil inlet is communicated with the oil vent.

* * * * *